(12) United States Patent
Chan et al.

(10) Patent No.: US 10,254,986 B2
(45) Date of Patent: *Apr. 9, 2019

(54) IMPLICIT COORDINATION FOR DEPLOYMENT OF COMPUTING SYSTEMS USING A DATA SHARING SERVICE

(71) Applicant: International Business Machines Corporation, Armonk, NY (US)

(72) Inventors: Hoi Y. Chan, New Canaan, CT (US); Thomas Gschwind, Zurich (CH); Michael H. Kalantar, Chapel Hill, NC (US); Lakshminaraya Renganarayana, San Jose, CA (US); Florian Rosenberg, Perg (AT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/660,126

(22) Filed: Jul. 26, 2017

(65) Prior Publication Data
US 2017/0322744 A1 Nov. 9, 2017

Related U.S. Application Data

(63) Continuation of application No. 14/749,878, filed on Jun. 25, 2015, now Pat. No. 9,733,856, which is a (Continued)

(51) Int. Cl.
*G06F 13/00* (2006.01)
*G06F 3/06* (2006.01)
*H04L 29/08* (2006.01)

(52) U.S. Cl.
CPC .......... *G06F 3/0629* (2013.01); *G06F 3/0604* (2013.01); *G06F 3/067* (2013.01); *H04L 67/1078* (2013.01); *H04L 67/34* (2013.01)

(58) Field of Classification Search
CPC ... H04L 67/34; H04L 67/1078; G06F 3/0629; G06F 3/0604; G06F 3/067
(Continued)

(56) References Cited

U.S. PATENT DOCUMENTS 7,801,912 B2  9/2010  Ransil et al.
8,370,423 B2  2/2013  Ozzie et al.
(Continued)

OTHER PUBLICATIONS

Almasan, V; "A Monitoring Tool to Manage the Dynamic Resource Requirements of a Grid Data Sharing Service", Research Master in Computer Science Internship Report, Feb.-Jun. 2006, pp. 1-52, IFSIC, University de Rennes I, IRISA, Project Paris.
(Continued)

*Primary Examiner* — Kenneth R Coulter
(74) *Attorney, Agent, or Firm* — Fleit Gibbons Gutman Bongini Bianco PL; Thomas S. Grzesik

(57) ABSTRACT

Various embodiments manage deployable computing environments. In one embodiment, a system model of a computing environment that includes a set of computing resources is analyzed. The system model at least describes properties of each of the set of computing nodes and identifies a plurality of configuration operations to be executed by each of the set of computing nodes during deployment. A set of dependency information is generated for each of the set of computing nodes based on analyzing the system model. The set of dependency information identifies at least one dependency between two or more of the plurality of configuration operations. An executable coordination operation is added to each of the plurality of configuration operations. The executable coordination operation automatically coordinates execution of the plurality of configuration operations on the computing node.

20 Claims, 12 Drawing Sheets

Related U.S. Application Data continuation of application No. 14/674,129, filed on Mar. 31, 2015, now Pat. No. 9,665,299.

(58) Field of Classification Search
USPC .............................. 709/223, 224, 220–222
See application file for complete search history.

(56) References Cited

U.S. PATENT DOCUMENTS

| | | | |
|---|---|---|---|
| 8,538,917 B2 | 9/2013 | Piccirelli et al. | |
| 8,554,758 B1 | 10/2013 | Larson et al. | |
| 8,903,997 B2 | 12/2014 | Hobbs | |
| 9,665,299 B2* | 5/2017 | Chan | G06F 3/0629 |
| 9,733,856 B2* | 8/2017 | Chan | G06F 3/0629 |
| 2006/0029054 A1 | 2/2006 | Breh et al. | |
| 2009/0300169 A1 | 12/2009 | Sagar et al. | |
| 2012/0066358 A1 | 5/2012 | Hobbs | |
| 2013/0024562 A1* | 1/2013 | Hobbs | H04L 41/08 709/224 |
| 2013/0318160 A1 | 11/2013 | Beraka et al. | |
| 2014/0019611 A1 | 1/2014 | Weavind et al. | |
| 2014/0020043 A1 | 1/2014 | Anand et al. | |
| 2014/0115560 A1 | 4/2014 | Hutchison | |
| 2014/0143262 A1 | 5/2014 | Ingvalson | |

OTHER PUBLICATIONS

Le, H., et al.; "A Transaction Framework for Mobile Data Sharing Services", Mobile Ubiquitous Computing, Systems, Sep. 29-Oct. 4, 2008, pp. 1-7, UBICOMM'08/IEEE 2nd International Conference on Services and Technologies. DOI 10.1109/UBICOMM.2008.23.

Wang, J., et al.; "Middleware Enabled Data Sharing on Cloud Storage Services", AMC/MW4SOC'10 Proceedings of the 5th International Workshop on Middleware for Service Oriented Computing, Nov. 29, 2010, pp. 1-6.

\* cited by examiner

```
topology(:rubis) {
  node(:front_end) {
    name "RUBiS front-end node"
    description "Serves requests for static content and balances the load to the application tier"

component(:rubis_front_end) {
      name "RUBiS Web fron-end on Apache"
      description "RUBiS static html pages"

property :document_root => "rubis"
      property :jk_servlet_regex => "/rubis/servlet/*"
    }
  } node(:app) {
    name "RUBiS business logic node"
    description "Runs the bidding system logic, accessing the RUBiS database to generate dynamic content to end-users"

component(:rubis_app) {
      name "RUBiS application logic"
      description "RUBiS servlets"

property :min_threads => 30, :validators => [ range(10, 50) ]
      property :max_threads => 1024, :validators => [ range(128, 2048) ]

property :load_balancer_factor => 1, :validators => [ value_type(:numeric) ]
      property :jk_port => 8009, :validators => [ range(8009, 8012) ]
    }
  } node(:db) {
    name "RUBiS database node"
    description "Database containing all tables used by the RUBiS application"

component(:rubis_db) {
      name "RUBiS database"
      description "RUBiS data: users, items, bids, comments, etc."

property :sql_schema_file => "http://alpine03.pok.ibm.com/rubis/rubis_small_db.sql.gz",
      property :wait_timeout => "31536000"
    }
  }
}
```

404
   402                                    406
     \    import 'ubuntu12_10_with_be.weaver' => :images topology (:rubis_pattern) { provider(:openstack) {
            openstack_username config[:openstack][:openstack_username]
   408      openstack_api_key config[:openstack][:openstack_api_key]
            openstack_auth_url config[:openstack][:openstack_auth_url]
            openstack_tenant config[:openstack][:openstack_tenant]
            openstack_region config[:openstack][:openstack_region]
          }                                                            410
                                                                          412
          use images.ubuntu12_10_with_be => :apache_server
          use images.ubuntu12_10_with_be => :tomcat_server
          use images.ubuntu12_10_with_be => :mysql_server
                                                                  414

[apache_server, tomcat_server, mysql_server].each do |n|
            n.security_group_ids = ['test']
            n.key_pair_name 'weaver_sample'
            n.elastic_ip (:eip)
            n.flavor_id "2"
          end mysql_server.flavor_id = "4"
        }
```

```
504 ─▶  import 'rubis-app.weaver'
        import 'rubis-pattern.weaver'

502 ─▶  topology('rubis_openstack') { name "RUBiS three-tier pattern on OpenStack"
          description "RUBiS application on a three-tier pattern: Apache, Tomcat, and MySQL"

506 ─▶    use :rubis_pattern => :pattern
          use :rubis
                                                              510
508 ─▶    realizes rubis.front_end => pattern.apache_server  ◀─┘
          realizes rubis.app => pattern.tomcat_server ◀── 512
          realizes rubis.db => pattern.mysql_server ◀── 514

516 ─▶    property 'rubis_servlets_url' => "http://alpine03.pok.ibm.com/rubis/rubis_servlets.jar", :description => "URL from which the R
          property 'rubis_web_url' => "http://alpine03.pok.ibm.com/rubis/rubis-static.tgz", :description => "URL from which the RUBiS We 518 ─▶    rubis.app.rubis_app.min_threads = 20
          rubis.app.rubis_app.max_threads = 300

Setting up automation parameters

503 ─▶    rubis.front_end.include "./automation/rubis_frontend_role.weaver"
          frontend_role = rubis.front_end.rubis_frontend_role
          frontend_role.rubis_document_root = rubis.front_end.rubis_front_end.document_root
          frontend_role.rubis_web_source_url = rubis.web_url
          frontend_role.modjk_servlet_regex = rubis.front_end.rubis_front_end.jk_servlet_regex
          frontend_role.modjk_requestlogformat = "%R %V %T"
          frontend_role.rubis_modjk_workers = late_binding { all(rubis.app.private.hostname).zip(all(rubis.app.rubis_app.worker_id), al
``` continued to FIG. 6 continued from FIG. 5 — ① — continued from FIG. 5

602:
```
rubis.app.include "../automation/rubis_app_role.weaver"
app_role = rubis.app.rubis_app_role
app_role.rubis_tomcat_jkport = rubis.app.rubis_app.jk_port
app_role.rubis_tomcat_jvm_route = rubis.app.rubis_app.worker_id
app_role.rubis_tomcat_min_threads = rubis.app.rubis_app.min_threads
app_role.rubis_tomcat_max_threads = rubis.app.rubis_app.max_threads
app_role.rubis_servlets_source_url = rubis_servlets_url app_role.rubis_tomcat_db_host = rubis.db.private.hostname
app_role.rubis_tomcat_db_name = 'rubis'
```

604:
```
rubis.db.include "../automation/rubis_db_role.weaver"
db_role = rubis.db.rubis_db_role
db_role.rubis_db_source_url = rubis.db.rubis_db.sql_schema_file
db_role.mysql_tunable_wait_timeout = rubis.db.rubis_db.wait_timeout
}
```

FIG. 6

IMPLICIT COORDINATION FOR DEPLOYMENT OF COMPUTING SYSTEMS USING A DATA SHARING SERVICE

CROSS REFERENCE TO RELATED APPLICATION

This application is a continuation of and claims priority from U.S. application Ser. No. 14/749,878 filed on Jun. 25, 2015, which is a continuation of U.S. application Ser. No. 14/674,129 filed on Mar. 31, 2015, now U.S. Pat. No. 9,665,299, issued on May 30, 2017, the disclosure of which is hereby incorporated by reference in their entirety.

BACKGROUND

The present disclosure generally relates to computing systems management, and more particularly relates to coordinating the deployment of computing systems using a data sharing service.

Managing computer systems is becoming an increasingly difficult task. System deployment, configuration management, software upgrading, and problem determination are examples of typical management tasks, all of which are time-consuming, error-prone, and non-trivial. The difficulty of such tasks is aggravated by the complexity of modern systems comprising a number of distributed and cross-dependent components.

BRIEF SUMMARY

In one embodiment, a method for managing deployment of computing environments is disclosed. The method comprises analyzing a system model of a computing environment comprising a set of computing resources. The system model at least describes properties of each of the set of resources including a set of computing nodes. The system model further identifying a plurality of configuration operations to be executed by each of the set of computing nodes during deployment. A set of dependency information is generated for each of the set of computing nodes based on analyzing the system model. The set of dependency information identifies at least one dependency between two or more of the plurality of configuration operations associated with at least one of a computing node in the set of computing nodes, and the computing node and at least one other computing node in the set of computing nodes. An executable coordination operation is added to each of the plurality of configuration operations based on the set of dependency information. The executable coordination operation automatically coordinates execution of the plurality of configuration operations on the computing node based on the set of dependency information.

In another embodiment, a method for managing deployment of computing environments is disclosed. The method is performed by at least one computing node in a set of computing nodes being deployed as part of a computing environment. The method comprises executing, by the computing node, a coordination script during deployment of the computing node. The coordination script automatically coordinates execution of a plurality of configuration operations on the computing node. Each of the plurality of configuration operations automatically configures the computing node for operation. In response to executing the coordination operation, a shared storage device is accessed and a set of dependency information is obtained therefrom. The shared storage device is accessible by each of the set of computing nodes. The set of dependency information identifies at least one dependency between two or more of the plurality of configuration operations associated with at least one of the computing node, and the computing node and at least one other computing node in the set of computing nodes. Each of the plurality of configuration operations is executed based on the set of dependency information.

In yet another embodiment, an information processing system for managing deployment of computing environments is disclosed. The information processing system comprises memory and a processor communicatively that is coupled to the memory. A systems manager is communicatively coupled to the memory and the processor. The systems manager is configured to perform a method. The method comprises executing, by the computing node, a coordination script during deployment of the computing node. The coordination script automatically coordinates execution of a plurality of configuration operations on the computing node. Each of the plurality of configuration operations automatically configures the computing node for operation. In response to executing the coordination operation, a shared storage device is accessed and a set of dependency information is obtained therefrom. The shared storage device is accessible by each of the set of computing nodes. The set of dependency information identifies at least one dependency between two or more of the plurality of configuration operations associated with at least one of the computing node, and the computing node and at least one other computing node in the set of computing nodes. Each of the plurality of configuration operations is executed based on the set of dependency information.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIGS. 2-6 illustrate various examples of system models for a deployable computing environment according to one embodiment of the present disclosure;

DETAILED DESCRIPTION

Operating Environment

Figure 1:
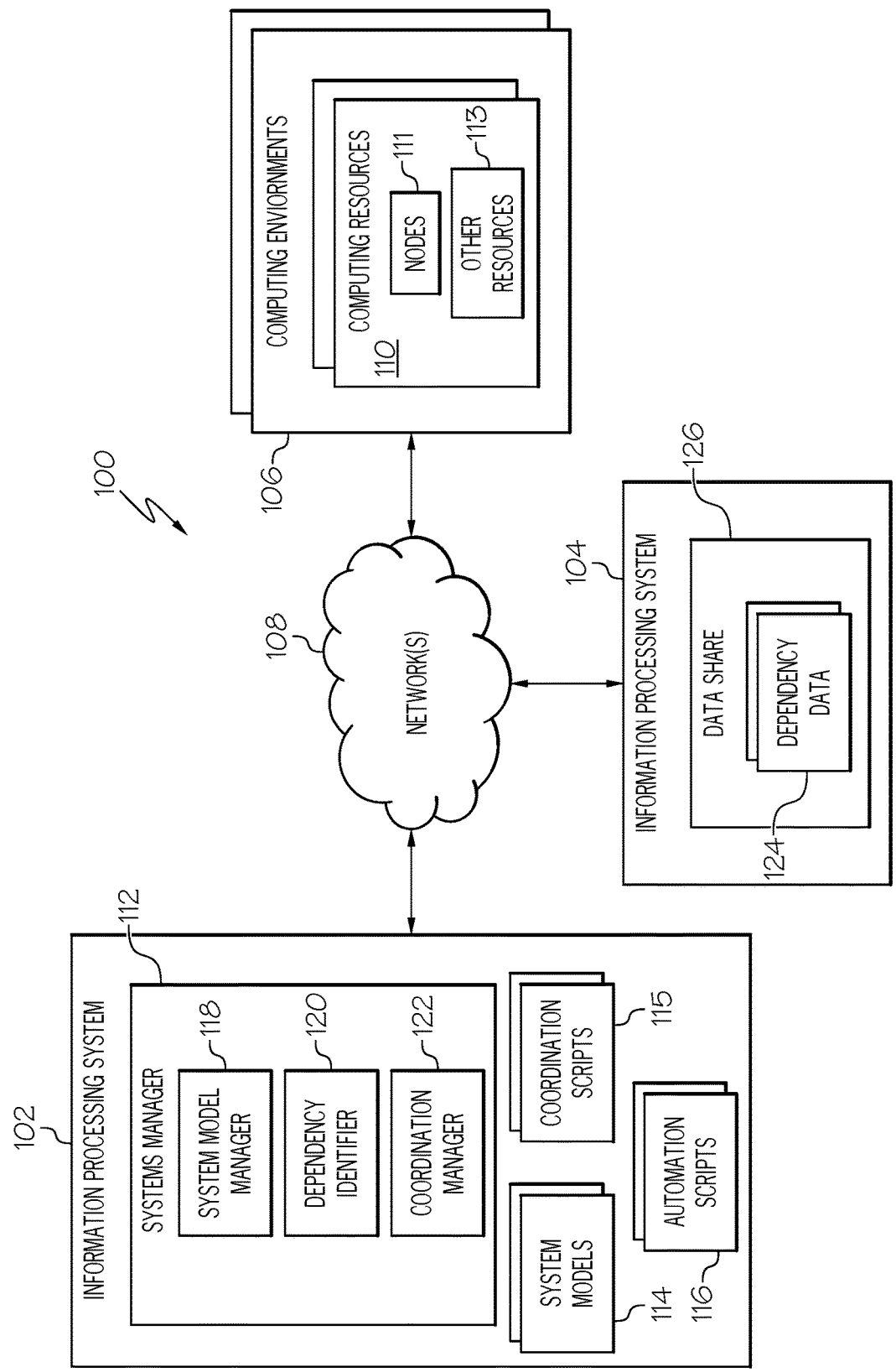
FIG. 1 is a block diagram illustrating one example of an operating environment according to one embodiment of the present disclosure.

FIG. 1 shows one example of an operating environment 100 for deploying and configuring software defined computing environments. Deploying and configuring a software defined computing environment, in one embodiment, refers to creating and/or configuring a set of computing resources including (but not limited to) physical or virtual servers, storage resources, network resources and software resources such that the resulting computing system can be used for a specific purpose such as, for example, processing order requests. In particular, FIG. 1 shows one or more information processing systems 102, 104 and (software defined) computing environments 106 communicatively coupled to at least one network 108. In one embodiment, the network 108 comprises a local area network (LAN), a general wide area network (WAN), and/or a public network (e.g., the Internet).

Each computing environment 106, in one embodiment, is a single logical computing system comprising computing resources 110. Examples of computing resources 110 include nodes 111 such as physical or virtual information processing systems and other resources 113 such as (but not limited to) cloud computing resources (e.g., virtual images, storage volumes, firewalls, etc.), software (e.g., operating systems, middleware, application, etc.), hardware resources (e.g., storage and networks), remote services, automation scripts, and/or the like. The computing environments 106 can be collections of physical information processing systems; virtual computing environments such as virtual machines executing on one or more physical information processing systems; and/or the like. In some embodiments, the one or more computing environments 106 are part of a cloud-computing environment. However, in other embodiments, these environments 106 part of a non-cloud computing environment.

At least one of the information processing systems 102 comprises a systems manager 112, system models 114, coordination scripts 115, and automation scripts 116 (also referred to herein as "configuration operations 116" and "configuration actions 116"). A configuration action, in one embodiment, is any logic that is executed by the systems manager 112, a proxy, and/or a node 111 to reserve, deploy/instantiate and/or configure a computing resource 110 as part of a computing environment 106. Such actions are typically in the form of scripts (in languages such as shell, bash, Python, Ruby, etc.).

The systems manager 112 comprises a system model manager 118, a dependency identifier 120, and coordination manager 122. The systems manager 112 manages the deployment and configuration of computing environments 106. In one embodiment, the systems manager 112 provides an implicit coordination mechanism that derives dependency data 124 from the system models 114 and stores the dependency data 124 in a data share 126, which is accessible by all nodes 111 among the computing resources 110 that are part of a single computing environment being deployed and configured. The dependency data 124 is used at deployment time to coordinate the execution of deployment/configuration operations and the sharing of data among the nodes 111. Therefore, coordination logic does not need to be explicitly specified by the configuration scripts 116. This is advantageous over conventional deployment/configuration systems, which generally require users to explicitly specify the order in which operations are to be executed when deploying/configuring a computing environment. The implicit coordination mechanism provided by the systems manager 112 allows the manager to provide configuration operations or actions to all nodes 111 in parallel, even with incomplete or invalid data. The configuration operations can be started on all nodes 111 immediately and only need to be paused at the time a required attribute value is needed. A node 111 can then obtain the required data/attribute from the data share 126. The systems manager 112 and its components are discussed in greater detail below.

In one embodiment, one or more of the information processing systems 104 (herein referred to as a "coordinator system" 104) comprise the data share 126, which is accessible to the systems manager 112 and each of the nodes 111. The data share 126 is composed of one or more storage devices (e.g., memory, storage disks, etc.) residing on a single information processing system or distributed across multiple information processing systems. The data share 126 can also be distributed across a plurality of nodes 111 being deployed within a computing environment 106. Data shares may be implemented, for example, by a database (e.g., DB2, MySQL, CouchDB, MongoDB), configuration repository (e.g. Zookeeper, Redis, etc.), or distributed shared memory. The data share 126 maintains installation/configuration dependency data 124 derived by the dependency identifier 120 from the system models 114, which as discussed in greater detail below. Dependency data 124 comprises data such as which inputs to automation scripts 116 depend on which outputs of other automation scripts. For example, a configuration action to be run on an application server may have a dependency on the address of a database server. This address is produced by the configuration action that deploys the database server. Another example is a requirement for access keys by a configuration action on one node to configure software which are generated by a configuration action on another node.

In one embodiment, the systems manager 112 processes system models 114 for model validation, system deployment, and configuration automation. In one embodiment, the systems manager 112 validates the computing environment 106, as provided by the system models 114, for correctness at design time. This ensures that no requirements are missing and that the constituent building blocks are compatible and can be put together harmoniously without violating any constraints. Detecting problems before deployment can save time that would otherwise be spent debugging a complex running system.

In addition to validating the modeled computing environment and identifying dependency data, the systems manager 112 also begins execution of the configuration actions 116 based on the system model 114 to reserve, instantiate and configure the computing resources 110 that are to make up the modeled computing environment 106. For example, virtual machines are to be created, storage volumes are created and/or attached, network configuration are performed, and software configuration scripts 116 (which may be executed on the nodes 111) are initiated to install/configure software.

System Models

System models 114 are models that describe a target computing environment 106 (which may already be fully, partially or not at all deployed/instantiated) in terms of its architecturally significant components. Stated differently, a system model 114 expresses a desired state of a computing environment 106 in terms of its resources, services, and software. A system model 114 also references automation scripts 116 needed to implement and maintain the desired state. These models 114 may also be executable serving as the infrastructure code for automating system deployment and configuration. In this case, the system model 114 is executed by a runtime; that is the systems manager 112, to create and modify the modeled computing environment 106.

A system model 114 can either be a single contiguous entity such as a single file or be composed of several different entities. In one embodiment, a system model 114 is a model that not only describes a computing environment 106 as a topology encompassing a collection of semantic and automation elements, but also triggers the creation and/or configuration of the infrastructure resources (part of the computing resources 110) of a computing environment 106, and triggers the execution of automation scripts 116 to deploy and/or configure the software stack on the infrastructure resources. The result of the system model execution is a deployed and/or configured computing environment 106.

In one embodiment, a system model 114 describes a target computing environment as a topology encompassing a collection of building blocks (computing resources 110) that are composed together. Building blocks include, for example, cloud resources (virtual images, storage volumes, firewall, etc.) as well as the middleware stack and application components. A system model 114 implicitly specifies the set of configuration actions 116 needed to reserve, create/instantiate, and configure the computing resources. In addition, a system model 114 may include explicitly descripted automation building blocks comprising specifications of additional automation scripts 116 used to install and configure software resources. System models 112 are described in a modeling language such as (but not limited to) a Ruby-based Domain Specific Language (DSL) for system modeling. One example of a modeling language for creating system models is provided in Kalantar et al. "Weaver: Language and Runtime for Software Defined Environments", IBM Journal of Research and Development (Volume: 58, Issue: 2/3), pp. 10:1-10:12, 2014, which is hereby incorporated by reference in its entirety. It should be noted that although some embodiments are discussed using Weaver as the system model language, other system model languages are applicable as well.

When configuration actions should be executed on specific computing resources (nodes 111), the system models 114 describe and identify the targets on which actions are to be executed. If the target has already been deployed/instantiated the model 114 provides sufficient information to locate and access the target. If the target is to be created by another configuration action run by the system manager 112, as part of the deployment or configuration process (e.g., by a cloud service), the model 114 provides sufficient information to create the system in addition to any information (beyond what the create process provides) necessary to access the system to subsequently run configuration actions.

In addition to the target nodes, system models 114 describe at least those configuration actions (either implicit or explicit) which have dependencies on other actions and those on which another action depends. System models 114 also describe how the inputs to one action that has a dependency on others are related to the outputs of other actions.

In one embodiment, the inputs to and the outputs from each action are described using properties of computing resources (in the case of implicit configuration actions) or properties of automation model objects (in the case of explicit automation scripts). When relationships exist between properties, assignment is used to express the relationship. For example, an action "app_role" to configure a Tomcat application server has an input property "rubis_tomcat_db_host". The assignment app_role.rubis_tomcat_db_host=rubis.db.ip_address indicates that the value of this property is the value of the property "ip_address" from a node "rubis.db". The node "rubis.db" is created as part of the execution of a configuration action to create a virtual machine. The value of the "ip_address" property is available only after the node has been created and some portion of its configuration has completed (i.e., the network configuration). The assignment expresses a dependency between the "rubis_tomcat_db_host" property of the "app_role" configuration action and the "ip_address" property of the create "rubis.db" node configuration action.

A more complex example of an assignment is as follows:

```
frontend_role.rubis_modjk_workers = late_binding {
    all (rubis.app.hostname).zip (
        all (rubis.app.rubis_app.worker_id),
        all (rubis.app.rubis_app.jk_port),
        all (rubis.app.rubis_app.load_balancer_factor)
    ) .map { |hostname,name,port,lbfactor|
        {:hostname => hostname,
         :name => name,
         :port => port,
         :lbfactor => lbfactor
        } # Hash definition
    } # map
} # late_binding
```

In the above example, an action "frontend_role" has an input property "rubis_modjk_workers". The input property's value, as described by the Ruby expression within the "late_binding", is an array of objects containing four properties: ":hostname", ":name", ":port" and ":lbfactor". Each of these properties comes from properties defined on the "rubis.app" nodes and on the "rubis.app" configuration action on those nodes. In this example a node name (such as "rubis.app") may refer to a single node or a set of nodes with common configuration properties. Use of the function "all( )" allows one to identify an array of properties, one from each node in the set. Hence, "all(rubis.app.hostname)" is an array of hostnames, one from each node in the set "rubis.app". In summary, the "rubis_modjk_workers" depends on properties "hostname" (on the "rubis.app" nodes), and on "worker_id", "jk_port", and "lbfactor" properties of the "rubis_app" actions on the "rubis.app" nodes. The dependency is wrapped as a "late_binding" expression indicating that the value of the assignee should be computed from the expression each time the value is read. The first example is also a late_binding, which does not always need to be explicitly stated.

It should be noted that an assignment can express not only which properties are needed, but how they should be combined with other properties to compute the actual value that will be needed. Such an expression cannot be evaluated until the dependent properties are available. Most conventional systems do not permit such expressions. If a value must be computed, the burden is placed on the consumer to compute the values from the raw inputs provided by the producers or on the producers to produce a value in the correct form. This may not be possible if the implementations of the scripts are not available. In such cases, it is necessary to introduce an intermediary to compute the needed values, delaying starting configuration action (and perhaps even a node and all actions on the node) until all inputs are available so that the computation can be completed.

FIGS. 2-5 show various examples of system models. In these examples, the models 200, 300, 400, and 500 utilize a Ruby-based DSL; however, other modeling languages are applicable as well. FIG. 2 shows one example of a system model 200 representing an application topology 202 of a computing environment. The system model 200 of FIG. 2 comprises a plurality of computing resources 204, 206, 208, which are represented by the keyword "node". Each computing resource comprises a name, a description, and application components such as 210, 212, and 214 in FIG. 2. Each application component comprises a name 216, a description 218, and properties 220 whose values are used to configure the component at deployment/configuration time.

Figure 3:
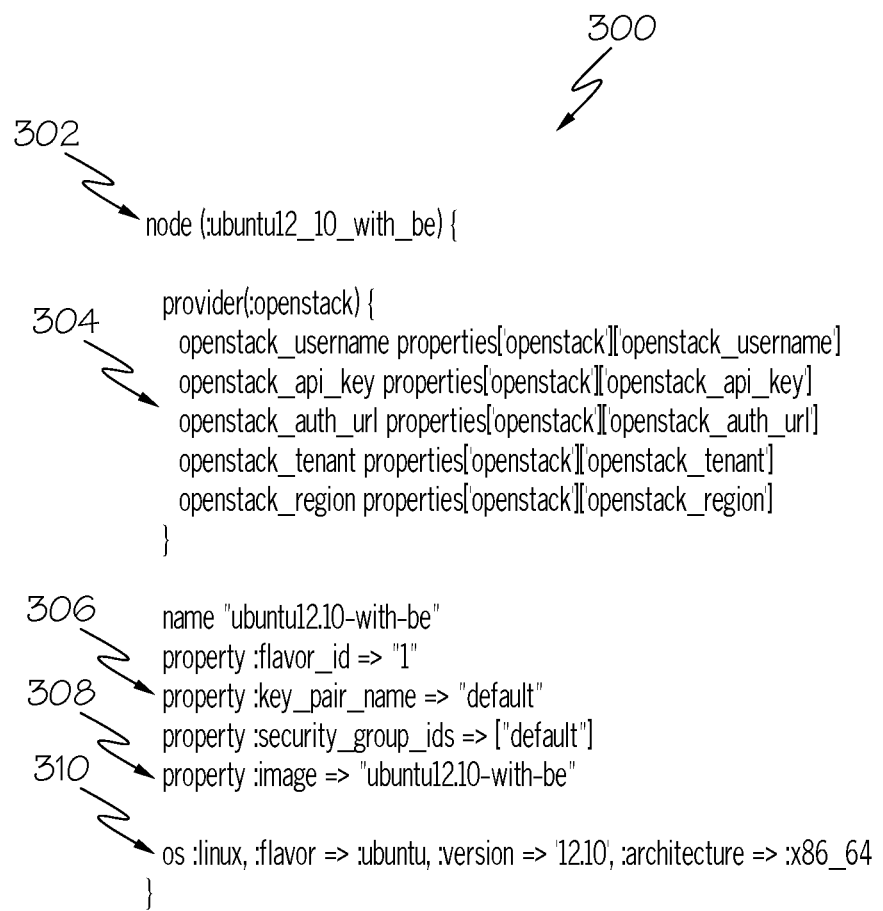

FIG. 3 shows one example of a system model 300 representing a virtual image 302 of a target cloud environment. The system model 300 comprises: a representation of cloud-specific connection and authentication parameters 304, used as inputs to the configuration action to create virtual machines from the virtual image; properties 306 comprising default values for parameters representing key characteristics of virtual servers to be created from the virtual image; a property 308 whose value matches the unique identification of the image in the cloud; and the specification 310 of the characteristics/attributes of the operating system installed on the image. These properties also represent output properties of the configuration of the action used to create virtual machines from the virtual image.

FIG. 4 shows one example of a system model 400 representing an infrastructure topology 402 of a computing environment. The system model 400 comprises an "import" statement 404 that effectively incorporates the system model 300 of FIG. 3 in its entirety. Furthermore, the statement 404 declares that the system model 300 can be referred to by the system model 400 using the symbol "images" 406. The system model 400 comprises cloud-specific connection and authentication parameters 408 which are inputs to the deployment configuration action and override the values of the properties defined in 304 incorporated by the import statement 404. The system model 400 also creates three distinct references 410, 412, 414 to the virtual image represented by the system model 300 of FIG. 3, which in effect represents three computing resources as nodes in the system model 400 by the symbols "apache_server" (410), "tomcat_server" (412), and "mysql_server" (414). The system model 400 finally assigns values to key cloud-specific parameters for each of the three computing resources. Upon deployment, these computing resources are instantiated as virtual servers from the virtual image represented by the system model 300 of FIG. 3.

FIGS. 5 and 6 show one example of a system model 500 representing a computing environment topology 502 that ties together the application topology 202, the infrastructure topology 402, as well as automation scripts 116 referenced by the system model 500 in 503 (FIG. 6), 602 (FIG. 6), and 604 (FIG. 6). The system model 500 comprises "import" statements 504 that incorporate both the application topology 202 and the infrastructure topology 402. The environment topology 502 comprises a name and a description. The topology 502 declares a reference by the symbol "pattern" 506 to the infrastructure topology 402 and a reference 508 by the symbol "rubis" to the application topology 200. The statements 510, 512, 514 map each node of the application topology 202 onto a corresponding node of the infrastructure topology 402. In particular, the logical application node "front_end" corresponds to the infrastructure node "apache_server"; the logical application node "app" corresponds to the infrastructure node "tomcat_server"; and the logical application node "db" corresponds to the infrastructure node "mysql_server". As a result of these mappings, the environment topology 502 comprises 3 computing resources represented as nodes. Each node is associated with the virtual image represented by the system model 300. Furthermore, the node "apache_server" (or "front-end") comprises the application component 210 ("rubis_front_end"); the node "tomcat_server" (or "app") comprises the application component 212 ("rubis_app"); and the node "mysql_server" (or "db") comprises the application component 214 ("rubis_db"). The environment topology 502 also defines properties 516 that can be referred to by other elements of the system model 500. In addition, in statements 518, the environment topology 502 overrides the values of two of the properties defined by component 212 ("rubis_app") in system model 200. Finally, code blocks 504, 606, 608 select automation scripts from the plurality of scripts 116 to be used to deploy the application components 210, 212, 214 to the nodes "front_end" (which corresponds to "apache_server"), app (which corresponds to "tomcat_server"), and "db" (which corresponds to "mysql_server"), respectively. Values of parameters of the automation scripts are also set by code blocks 503, 602, 604. These values will be consumed by the scripts upon their execution at deployment time.

Coordinating the Deployment of Computing Environments

The following is detailed discussion on coordinating the deployment of computing environments utilizing a shared data service. In one embodiment, the systems manager 112 processes one or more system models 114. After analyzing the system models 114, the systems manager 112 deploys the modeled computing environment. In one embodiment, the systems manager 112 first creates an in-memory model of the desired computing environment 106 from the system models 114. As will be discussed below, the in-memory model is then analyzed to identify relationships (dependencies) between property values. The dependencies are used to derive coordination requirements used during software configuration. Finally, the in-memory model is traversed to execute configuration scripts 116 that create or modify resources, for example, by using its own logic and/or a set of external services and platform providers, which provide target cloud specific resource implementations. As nodes 111 (e.g., virtual machine (VM) instances such as virtual servers) start they may execute a startup script to configure the software resources using the on the automation script(s) 116.

As noted above, the systems manager 112 analyzes the in-memory model generated based on system models 114 to identify relationships between property values. In one embodiment, the dependency identifier 120 analyzes the in-memory model to determine dependencies between the properties defined in the system models 114 (including between inputs of actions and outputs of other actions). In an embodiment, this calculation is performed by analyzing all assignment expressions when the system model is written using a Ruby DSL such as Weaver. Such an evaluation involves a simulation of the execution of the expressions to identify the properties they depend on. Note that dependency is a transitive relationship such that if property a depends on property b which, in turn, depends on property c, then property a depends on property c. An assignment expression is evaluated anytime the attribute value is read. When evaluated, any reference to an unknown symbol is treated as an index to the model of the runtime environment. In other words, the dependency identifier 120 utilizes the systems model(s) 114 for lookup. For example, the value of "rubis.db.ip_address", which is for the "ip_address" property of the "rubis.db" node, is pulled from the system model 114. When an assignment expression is evaluated, some expressions may not have a meaningful value. For example, the value "rubis.db.ip_address" is null if the "rubis.db" node has not yet been deployed. However, incomplete or invalid/null values are still recorded by the dependency identifier 120.

The dependency identifier 120 generates a set of dependency data 124 for each computing resource 110 involved in the deployment/configuration based on the analysis of the in-memory model, and stores this dependency data 124 within the data share 126. It should be noted that the dependency data 124 can include not only complete and known data, but also incomplete and/or unknown data such as null-value Internet Protocol (IP) address and host names that will be computed during deployment/configuration.

In one embodiment, the set of dependency data 124 is stored at the data share 126 as part of a coordination transaction defined by the systems manager 112. For example, a coordination transaction is created by systems manager 112 for a given deployment and configuration of a computing environment 106 based on the system models 114. The coordination transaction uniquely identifies this deployment/configuration. The systems manager 112 sends the coordination transaction to the coordinator system 104. The systems manager 112 and/or the coordinator system 104 uses the coordination transaction to manage and track the dependency data 124 stored by the dependency identifier 120 for a given deployment/configuration and any values written by computing resources 110 for the deployment/configuration.

The set of dependency data 124, in one embodiment, comprises read dependencies and write dependencies. The dependency identifier 120 generates a read dependency when it identifies input properties that have a dependency on another property. The dependency identifier 120 generates a write dependency when it identifies an output property of an operation on which another property depends from. Write dependencies at least identify the resource that performs the action parameter and the attribute (e.g., Internet Protocol address, host name, etc.)

Figure 7:
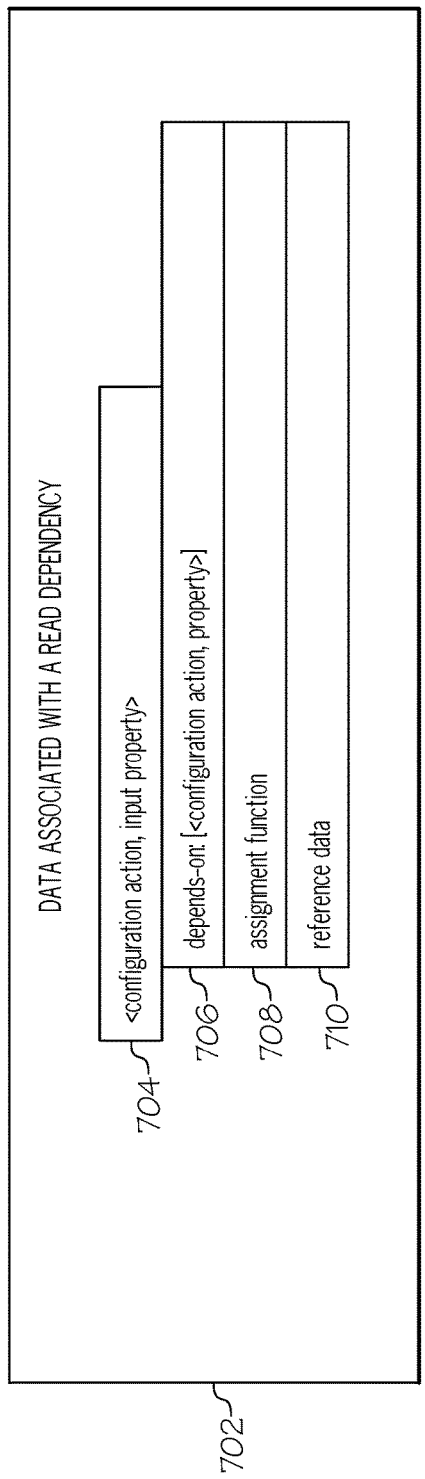
FIG. 7 illustrates one example of read dependency data for a deployable computing environment according to one embodiment of the present disclosure.
Figure 8:
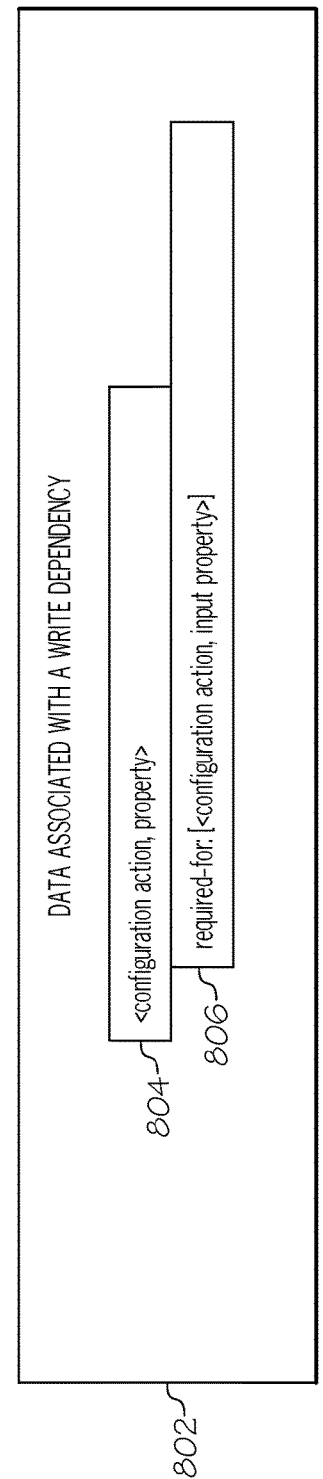
FIG. 8 illustrates one example of write dependency data for a deployable computing environment according to one embodiment of the present disclosure.

With reference to FIG. 7, a read dependency 702 associates to each input 704 of a configuration action a list of properties of other configuration actions 706 on which the value of the property 704 depends. Additional information may be associated with the read dependency. For example, an assignment function 708 that computes the value of property 704 from the properties on which it depends 706 may be included. If not provided, no computation is necessary (and the list of properties 706 has a single member). In addition, a set of reference data 710 may be included that includes values of constants references by the assignment function 808. FIG. 8 shows write dependency data 802 for a property 804 of a configuration action. Associated with the property is a set of input properties 806 to other configuration actions that require the value of the property 804.

Once the dependency identifier 120 has generated dependency data 124 for each computing environment defined by a set of system models 114 and stored in a data share 126, the coordination manager 122 inserts a coordination setup configuration action 115 into the sequence of configuration actions 116 assigned to each node 111, which are being configured as part of the computing environment 106, as the first configuration action. In one embodiment, the coordination manager 122 generates the coordination setup coordination action. In another embodiment, a common coordination setup action is used for all nodes 111. In one embodiment, the coordination setup action 115 is an executable script comprising input data such as dependency information, data share connection information (ex., hostname, port and protocol), and a coordination transaction identifier.

Once the coordination setup configuration action 115 has been added to a node, the set of all configuration actions can be executed on the node. In one embodiment, this execution is initiated by the deployment of the node 111 (in which case the coordination setup configuration action 115 is added to the set of configuration actions prior to the configuration action that provisions the node itself). In another embodiment, the system manager 112 initiates the execution of the configuration actions either as a unit or one by one via remote execution.

Figure 9:
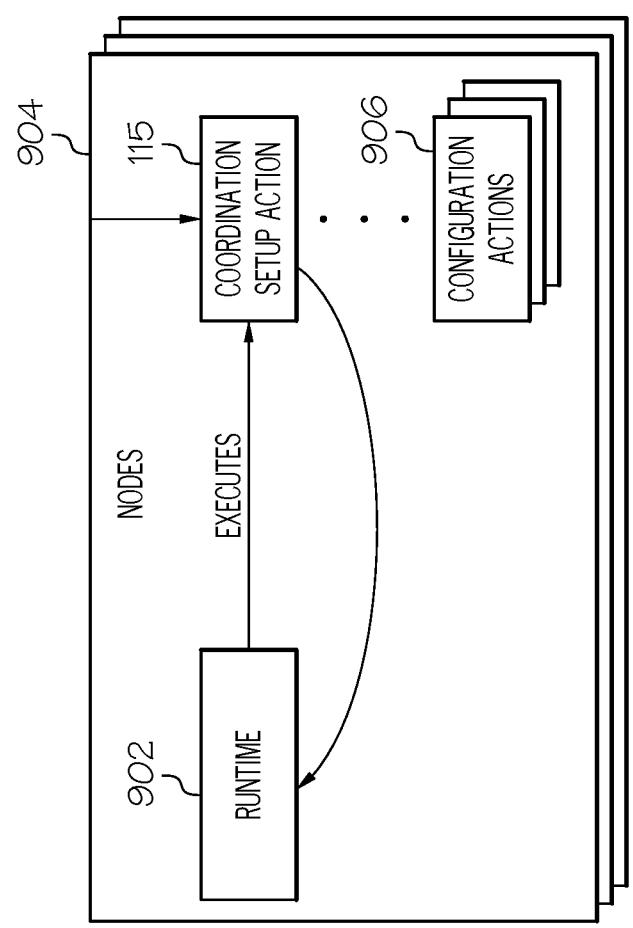
FIG. 9 illustrates one example of adding a coordination operation/script to a plurality of configuration actions of a computing node to be executed by the node during deployment according to one embodiment of the present disclosure.

With reference to FIG. 9, the coordination setup action 115 can be inserted at the beginning of all the actions 906 to be carried out by the node 904. For example, in an embodiment implementing a runtime environment 902 such as the Chef runtime environment, a reference to the coordination setup action 115 can be inserted at the start of the Chef role file defined for the node. In Chef, a role file identifies the recipes, or automations, that should be run to configure a node. The runtime environment 902 of the node 904 executes the coordination setup action 115, and based upon this execution is provided with the input information stored within the action 115 such as what to read/write from the coordinator system, when to wait for a completed status, etc. In addition, the coordination setup action 115 defines and informs the node 904 of various points of attribute interception. For example, the coordination setup action 115 instructs the node 904 on an attribute read to determine if the attribute is dependent on a remote value (a value provided by another node) and, if so, evaluate/read this value from the data share 126; instructs the node 904 on an attribute write to determine if the value is needed by another node and, if so, write this value to the data share 126; instructs the node 904 on its startup to write the status of the node as "configuring" to the data share 126; instructs the node 904 on role start to write the status of the node 904 as "configuring" to the data share 126; instructs the node 904 on role end to write the status of the node 904 as "configured" to the data share 126; and instructs the node 904 on a failure to write the status of the node 904 as "failed" to the data share 126.

In addition, the execution of the coordination setup action causes the node 904 to establish a communication link with the data share and register therewith. This registration, in part, assigns a unique identifier to the node or identifies a unique identifier already associated with the node to locate and identify dependency data 124 corresponding to the node 904. If the input to the coordination setup action does not already contain the dependency information, it may, in one embodiment, obtain it by querying the data share 126. For example, the node obtains dependency information such as read dependencies that identify the automation inputs having expressions that should be evaluated on the node using input from the data share 126; write_dependencies that identify automation outputs of the node that are required by other nodes in the deployment and should be written to the data share 126; and role_dependencies that identify which roles/nodes depend on what other roles/nodes.

In one embodiment, the coordination setup action 115 registers callback methods (i.e., methods that are to be called when certain events occur) associated with the following events: (a) the beginning of the execution of each chef role, (b) the end of the execution of all chef roles (i.e., when all configuration actions are complete), (c) before the read of any "node" attribute, (d) after the write of any "node" attribute, and (e) when a fatal exception occurs. In Chef, an object comprising all the inputs to each action (termed a "recipe") are made available via a "node" attribute.

Such callback methods can be registered by the coordination setup action 115 using a feature of a DSL, such as Ruby, called aspects. Aspects allow the registration of callback methods for actions associated with the execution of the Ruby program itself. The callback methods registered perform various options at the beginning of the execution of each Chef role, at the end of the execution of all roles/nodes (i.e., when all configuration actions are complete), before the read of any node attribute, after the write of any node attribute, and when a fatal exception occurs. Examples of operations performed at the beginning of the execution of each Chef role include writing to the data share 126 that previous role/node has completed and writing to the data share 126 that new role/node is started. Examples of operations performed at the end of the execution of all roles/nodes (i.e., when all configuration actions are complete) include writing to the data share 126 that the last role/node has completed.

Examples of operations performed before the read of any node attribute include evaluating the assignment expression stored with the read dependency if there is a read dependency noted for this attribute. In one embodiment, the input to the coordination action 115 includes a set values for known system model attributes referenced by the assignment expression. For any referenced attribute the callback methods first lookup the value in this list of known values. If no value is present, the callback methods read the value from the data share 126. This read operation performed by the node on the data share 126 is equivalent to a blocking read. That is, the read operation does not return until a value is available. The read operation returns if the configuration action on which the dependency exists fails, or if the node on which it runs fails. In another embodiment, referenced attributes, including known values are always read from the data store 126. In another embodiment, a set of known values is not available in which case the assignment operations are limited in their expressibility. Examples of operations performed after the write of any node attribute include writing the value written to the node attribute to the data sharing service if there is a write dependency noted for this attribute. Examples of operations performed when a fatal exception occurs include writing to the data share 126 that the node configuration has failed.

Figure 10:
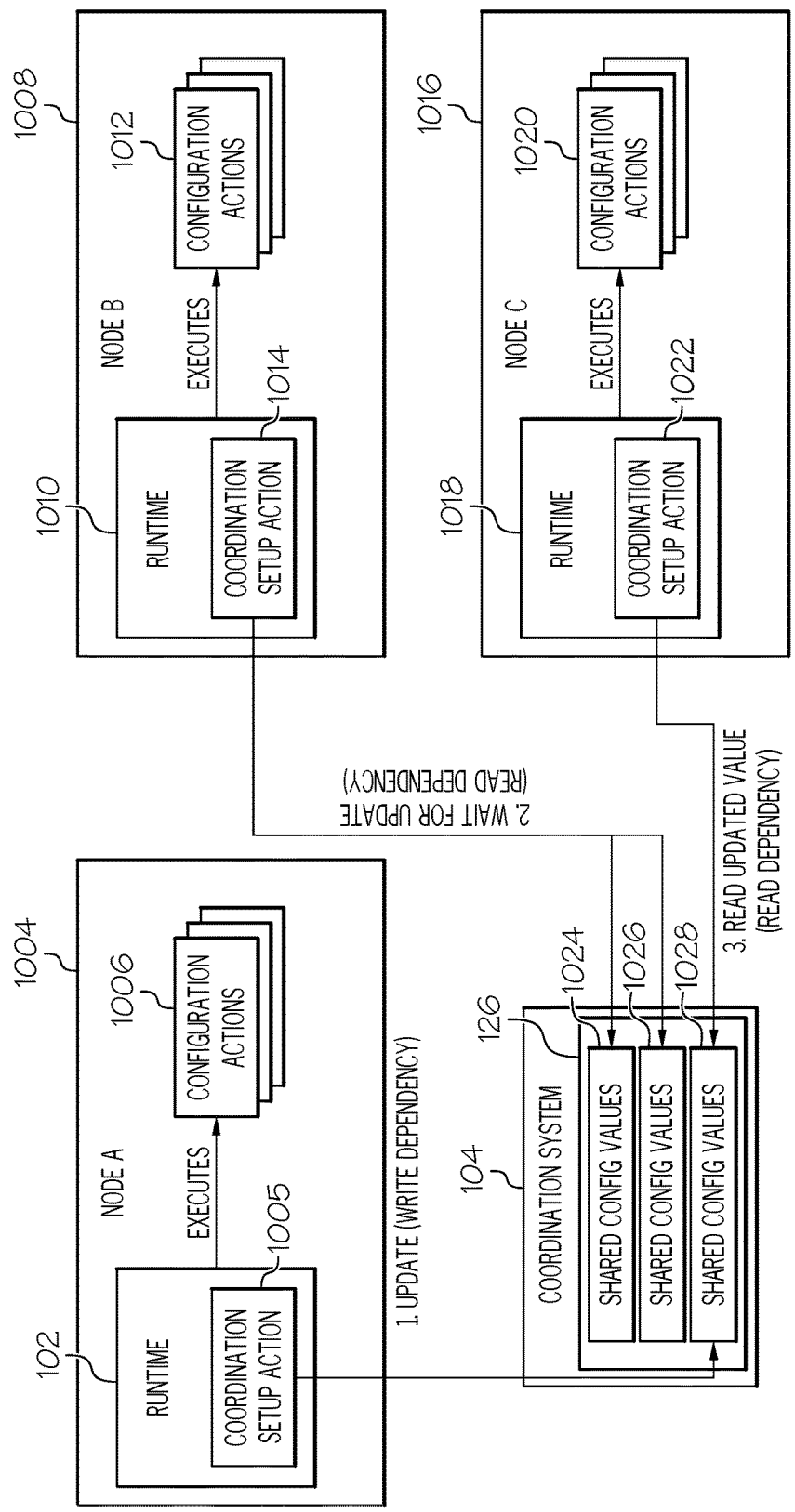
FIG. 10 illustrates one example of a computing environment being deployed in which a coordination script is executed by each computing node in the environment for coordinating the execution of configuration operations according to one embodiment of the present disclosure.

The coordination setup action 115 and data share 126 allow configuration operations to be initiated on all nodes of a given deployment simultaneously. These configuration operations proceed until an actual value is required. When this occurs, execution is blocked until the required value is made available in the data share 126 (i.e., written to the data share 126 by the node generating the value/data). For example, FIG. 10 shows one example with three different nodes 1004, 1008, 1016. Each node 1004, 1008, 1016 comprises a runtime environment 1002, 1010, 1018 that executes coordination setup actions 1005, 1014, 1022 and configuration actions 1006, 1012, 1020. In the example of FIG. 10, each of the nodes 1004, 1008, 1016 have obtained their dependency data 1024, 1026, 1028 from the data share 126 based on their coordination setup actions 1005, 1014, 1022 having been executed. However, this is only one way that the dependency data can be obtained by the nodes. For example, the dependency data can be send as part of the input to the coordination script, or be hardcoded in the script (if the script is unique to each node). Also, each of the nodes 1004, 1008, 1016 is executing their configuration actions 1006, 1012, 1020 simultaneously with the other nodes.

Node A 1004 has determined, based on its dependency data, that an attribute value it has generated is associated with a write dependency. Therefore, Node A 1004 writes this attribute value to the data share 126. Node B 1008 has determined, based on its dependency data, that a required attribute value is associated with a read dependency. Therefore, Node B 1008 halts (pauses) its configuration operations until the attribute value is available (e.g., has been written to the data share 126 by another node). Node C 1016 has determined, based on its dependency data, that it requires the attribute value generated by Node A 1004. Therefore, once Node A 1004 has written the attribute value to the data share 126, Node C 1016 obtains the value from the data share 126. The systems manager 112 monitors the data share 126 to determine when the nodes have either completed their configuration or have failed based on the status indicators written to the data share 126 by the nodes.

Operational Flow Diagram

Figure 11:
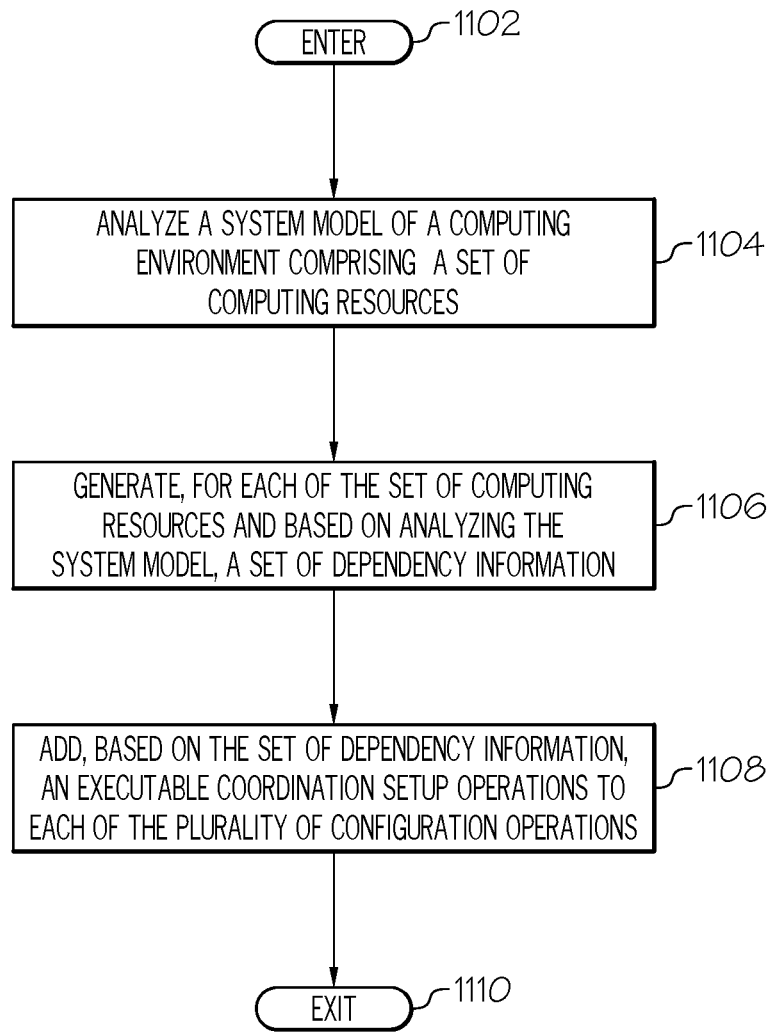
FIG. 11 is an operational flow diagram illustrating one example of managing deployable computer environments according to one embodiment of the present disclosure.

FIG. 11 is an operational flow diagram illustrating one example of managing deployable computing environments. The operational flow diagram of FIG. 11 begins at step 1102 and flows directly to step 1104. The systems manager 112, at step 1104, analyzes a system model 114 of a computing environment 106 comprising a set of computing resources 110. The system model 114 at least describes properties of each of the set of computing resources 110 and identifies a plurality of operations 116 to be executed to create and configure the computing environment 106 described by the model 114.

The systems manager 112, at step 1106, generates a set of dependency information 124, for each of the set of computing resources 110 based on analyzing the system model 114. The set of dependency information 124 identifies at least one dependency between two or more of the plurality of configuration operations 116 associated with at least one of the computing resources, and the computing resource and at least one other computing resource in the set of computing resources. The systems manager 112, at step 1108, adds executable coordination setup operations 115 to the plurality of configuration operations 116 based on the set of dependency information 124. The executable coordination setup operations 115 automatically coordinates the execution of the plurality of configuration operations 116 within its scope (e.g., within nodes 111) based on the set of dependency information 124. The control flow exits at step 1110.

Figure 12:
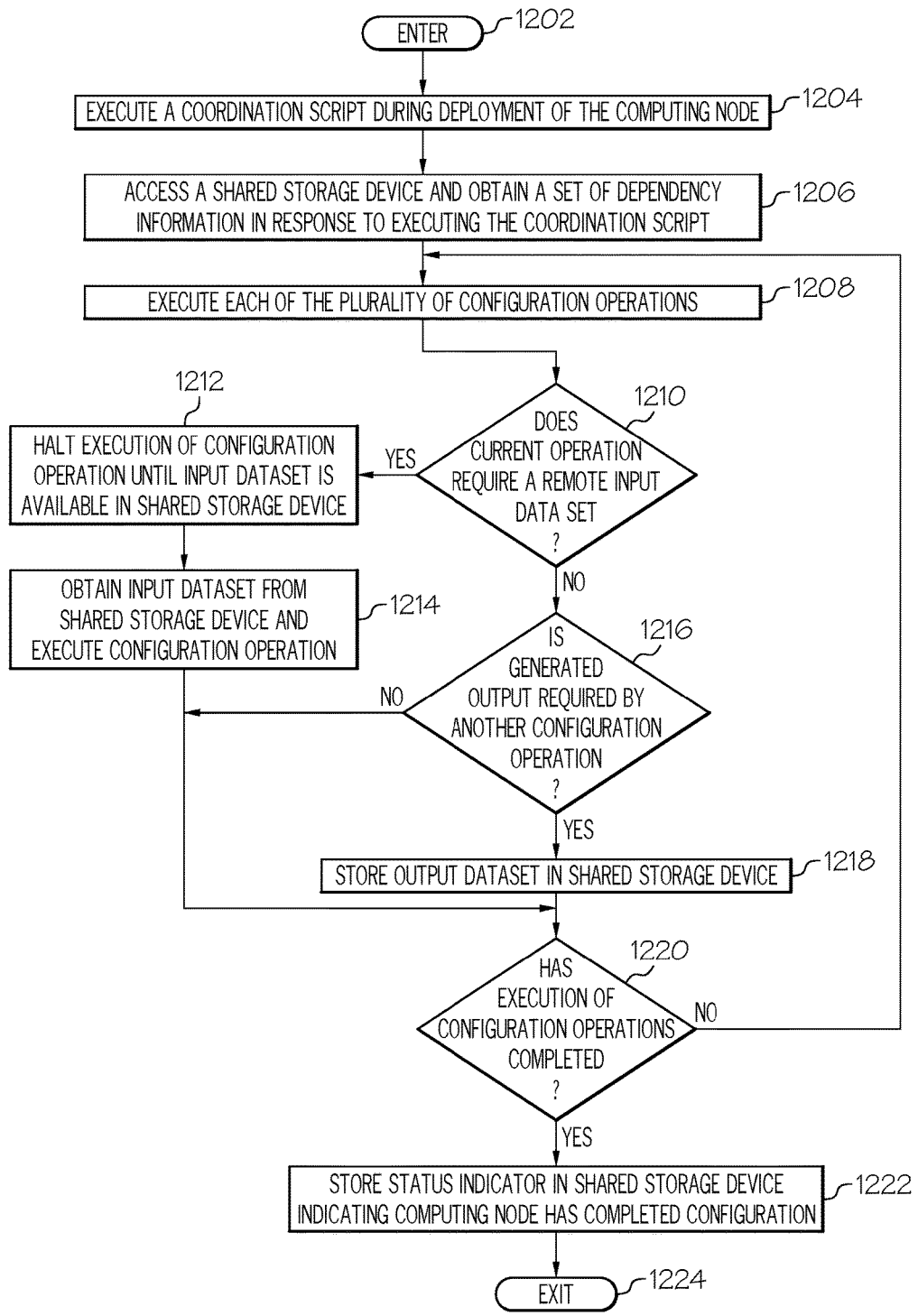
FIG. 12 is an operational flow diagram illustrating another example of managing deployable computer environments according to one embodiment of the present disclosure.

FIG. 12 is an operational flow diagram illustrating an example of managing the configuration of a node 111 in a computing environment 106. The operational flow diagram of FIG. 12 begins at step 1202 and flows directly to step 1204. A computing node 111 currently being deployed, at step 1204, executes a coordination setup configuration script 115. The coordination setup configuration script 115 configures the node 111 for coordinating the execution of a plurality of configuration operations 116 on the computing node 111 and configuration scripts to be executed elsewhere. The computing node 111, at step 1206, accesses a data share 126 and obtains a set of dependency information 124 therefrom in response to executing the coordination setup configuration operation 115. The data share 126 is accessible by the systems manager 112 and each computing node 111 being configured as part of the computing environment 106. The set of dependency information 124 identifies at least one dependency between two or more of the plurality of configuration operations 116 associated with at least the computing node 111 on which the coordination setup configuration operation is executed, and/or the computing node and at least one other computing resource in the set of computing resources 110. It should be noted that set of dependency information 124 can indicate that there are no dependencies if none were detected. It should also be noted that, in some embodiments, the node is not required to go to the data share 126 to obtain dependency data, as discussed above. The computing node 111, at step 1208, executes each of the plurality of configuration operations 116 utilizing the set of dependency information 124.

Upon or prior to executing each configuration operation 116, the computing node 111 is configured by the coordination setup configuration script 115, at step 1210, to obtain and utilize the dependency information 124 for determining if the configuration action 116 requires an input dataset that is not at least completely available locally. For example, a determination is made if the configuration action 116 has a read dependency on another configuration action executed elsewhere. If so, the computing node 111 is configured, at step 1212, to halt or prevent execution of the configuration operation 116 until the required data is available on the data share 126. In one embodiment, the computing node 111 may then execute one or more assignment functions associated with the read dependency 708, referencing a table of known values 710 to obtain the actual required input required. The computing node 111, at step 1214, obtains the input dataset from the data share 126 and executes (or continues to execute) the configuration operation.

Prior to or upon executing a configuration operation, the computing node 128 is also configured by the coordination setup configuration script 115, at step 1216, to determine based on the dependency information 124 if an output dataset of a configuration action is required as an input dataset by at least one other configuration action. If so, the computing node 111 is configured, at step 1218, to store the output dataset in the data share 126. The computing node 111, at step 1220 determines if execution of its configuration operations 116 has completed. If the result of this determination is negative, the control flow returns to step 1208. If the result of this determination is positive, the computing node 111, at step 1222, stores a status indicator in the data share 126 indicating that the computing node 106 has completed its configuration. The control flow exits at step 1224.

It should be noted that, in some embodiments, sets of configuration operations can be executed in groups. In this embodiment, the beginning and end of each group is written to the data share 126. Execution of the group as a whole can be considered a configuration action (that executes others) and can have dependencies as well and be forced to halt its execution and wait for its required input data to become available. It should also be noted that the check operations such as those shown in blocks 1210 and 1216 can be performed at each step of a configuration operation. For example, if a configuration operation needs to perform steps A, B, and C, the checks at blocks 1210 and 1216 can be performed at each of steps A, B, and C.

Information Processing System

Figure 13:
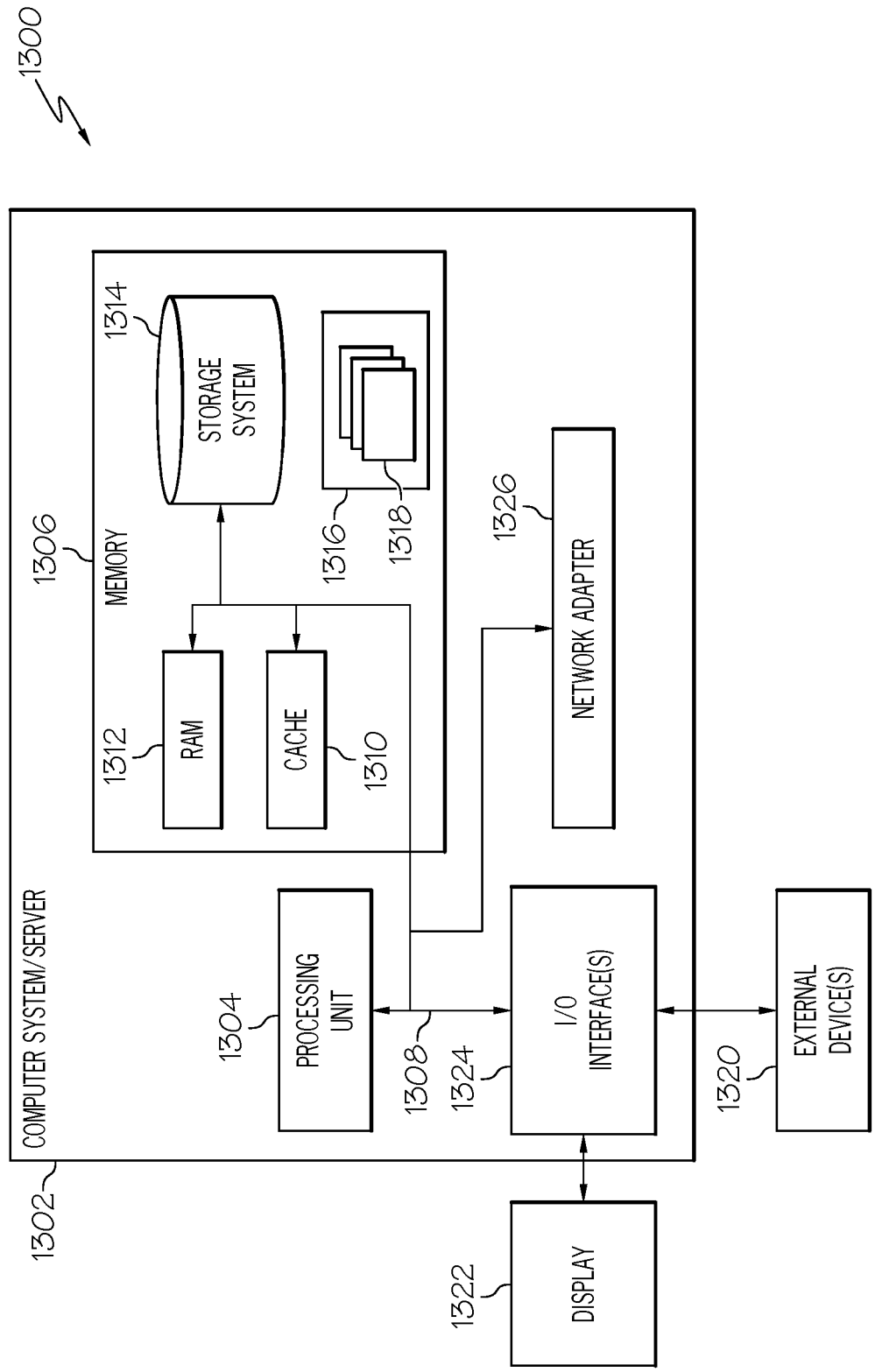
FIG. 13 is a block diagram illustrating a detailed view of an information processing system according to one embodiment of the present disclosure.

Referring now to FIG. 13, this figure is a block diagram illustrating an information processing system, such as the information processing system 102 shown in FIG. 1, which can be utilized in various embodiments of the present disclosure. The information processing system 802 is based upon a suitably configured processing system configured to implement one or more embodiments of the present disclosure. Any suitably configured processing system can be used as the information processing system 1302 in embodiments of the present disclosure. The components of the information processing system 1302 can include, but are not limited to, one or more processors or processing units 1304, a system memory 1306, and a bus 1308 that couples various system components including the system memory 1306 to the processor 1304.

Although not shown in FIG. 13, the systems manager 112 discussed above with respect to FIG. 1 can reside within the main memory 1306 and/or the processor 1304. This component can also be a separate hardware component as well. The bus 1308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 1306 can also include computer system readable media in the form of volatile memory, such as random access memory (RAM) 1310 and/or cache memory 1312. The information processing system 1302 can further include other removable/non-removable, volatile/non-volatile computer system storage media. By way of example only, a storage system 1314 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 808 by one or more data media interfaces. The memory 1306 can include at least one program product having a set of program modules that are configured to carry out the functions of an embodiment of the present disclosure.

Program/utility 1316, having a set of program modules 1318, may be stored in memory 1306 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of embodiments of the present disclosure.

The information processing system 1302 can also communicate with one or more external devices 1320 such as a keyboard, a pointing device, a display 1322 etc.; one or more devices that enable a user to interact with the information processing system 1302; and/or any devices (e.g., network card, modem, etc.) that enable computer system/server 1302 to communicate with one or more other computing devices.

Such communication can occur via I/O interfaces 1324. Still yet, the information processing system 1302 can communicate with one or more networks such as a local area network (LAN), a general wide area network (WAN), and/or a public network (e.g., the Internet) via network adapter 1326. As depicted, the network adapter 1326 communicates with the other components of information processing system 1302 via the bus 1308. Other hardware and/or software components can also be used in conjunction with the information processing system 1302. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer maybe connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing deployment of computing environments, the method comprising:
   analyzing a system model of a computing environment comprising a set of computing resources, the system model at least identifying a plurality of configuration operations to be executed by each of a set of computing nodes during deployment;
   generating, for each of the set of computing nodes and based on the analyzing, a set of dependency information identifying at least one dependency between two or more of the plurality of configuration operations; and
   adding, based on the set of dependency information, an executable coordination operation to each of the plurality of configuration operations, the executable coordination operation automatically coordinating execution of the plurality of configuration operations.

2. The method of claim 1, further comprising:
   deploying the set of computing nodes, the deploying comprising initiating execution of the plurality of configuration operations across the set of computing nodes in parallel.

3. The method of claim 1, further comprising:
   storing the set of dependency information in a data share accessible by each of the set of computing nodes.

4. The method of claim 1, wherein the executable coordination operation configures a computing node of the set of computing nodes to obtain the set of dependency information associated with the computing node from a data share accessible by each of the set of computing nodes prior to executing each of the configuration operations in the plurality of configuration operations.

5. The method of claim 4, wherein the executable coordination operation configures the computing node to
   determine, based on the set of dependency information, if a configuration operation in the plurality of configuration operations requires an input dataset that is not at least partially available locally; and
   based on determining that the configuration operation requires an input dataset that is not at least partially available locally, obtaining the input dataset from the data share.

6. The method of claim 4, wherein the executable coordination operation configures the computing node to
   determine, based on the set of dependency information, if an output dataset of a configuration operation in the plurality of configuration operations is required as an input dataset by at least one configuration operation of a different computing node in the set of computing nodes; and
   based on determining that the output dataset of the configuration operation is required as an input dataset by at least one configuration operation of a different computing node, storing the output dataset in the data share.

7. The method of claim 1, wherein generating the set of dependency information comprises:
   determining that a read dependency exists between at least a first configuration operation of the two or more of the plurality of configuration operations and at least a second configuration operation of the two or more of the plurality of configuration operations, the read dependency indicating that the first configuration operation requires an input generated by the second configuration operation.

8. The method of claim 1, wherein generating the set of dependency information comprises:
   determining that a write dependency exists between at least a first configuration operation of the two or more of the plurality of configuration operations and at least a second configuration operation of the two or more of the plurality of configuration operations, the write dependency indicating that an output generated by the first configuration operation is required as an input by the second configuration operation.

9. A method for managing deployment of computing environments, the method being performed by at least one computing node in a set of computing nodes being deployed as part of a computing environment, the method comprising:
   executing, by the computing node, a coordination script during deployment of the computing node, the coordination script automatically coordinating execution of a plurality of configuration operations on the computing node;
   in response to executing the coordination script, accessing a data share and obtaining a set of dependency information, and the set of dependency information identifying at least one dependency between two or more of the plurality of configuration operations; and
   executing each of the plurality of configuration operations based on the set of dependency information.

10. The method of claim 9, wherein the coordination script is executed prior to the plurality of configuration operations.

11. The method of claim 9, wherein executing the coordination script configures the computing node to:
  determine, based on the set of dependency information, if a configuration operation in the plurality of configuration operations requires an input dataset that is not at least partially available locally; and
  based on determining that the configuration operation requires an input dataset that is not at least partially available locally, obtaining the input dataset from the data share.

12. The method of claim 9, wherein executing the coordination script configures the computing node to:
  determine, based on the set of dependency information, if an output dataset of a configuration operation in the plurality of configuration operations is required as an input dataset by at least one configuration operation of a different computing node in the set of computing nodes; and
  based on determining that the output dataset of the configuration operation is required as an input dataset by at least one configuration operation of a different computing node, storing the output dataset in the data share.

13. An information processing system for managing deployment of computing environments, the information processing system comprising:
  memory;
  a processor communicatively coupled to the memory; and
  a systems manager communicatively coupled to the memory and the processor, the systems manager being configured to perform a method comprising
  analyzing a system model of a computing environment comprising a set of computing resources, the system model at least identifying a plurality of configuration operations to be executed by each of a set of computing nodes during deployment;
  generating, for each of the set of computing nodes and based on the analyzing, a set of dependency information identifying at least one dependency between two or more of the plurality of configuration operations; and
  adding, based on the set of dependency information, an executable coordination operation to each of the plurality of configuration operations, the executable coordination operation automatically coordinating execution of the plurality of configuration operations.

14. The information processing system of claim 13, the method further comprising:
  deploying the set of computing nodes, the deploying comprising initiating execution of the plurality of configuration operations across the set of computing nodes in parallel.

15. The information processing system of claim 13, the method further comprising:
  storing the set of dependency information in a data share accessible by each of the set of computing nodes.

16. The information processing system of claim 13, wherein the executable coordination operation configures a computing node of the set of computing nodes to obtain the set of dependency information associated with the computing node from a data share accessible by each of the set of computing nodes prior to executing each of the configuration operations in the plurality of configuration operations.

17. The information processing system of claim 16, wherein the executable coordination operation configures the computing node to
  determine, based on the set of dependency information, if a configuration operation in the plurality of configuration operations requires an input dataset that is not at least partially available locally; and
  based on determining that the configuration operation requires an input dataset that is not at least partially available locally, obtaining the input dataset from the data share.

18. The information processing system of claim 16, wherein the executable coordination operation configures the computing node to
  determine, based on the set of dependency information, if an output dataset of a configuration operation in the plurality of configuration operations is required as an input dataset by at least one configuration operation of a different computing node in the set of computing nodes; and
  based on determining that the output dataset of the configuration operation is required as an input dataset by at least one configuration operation of a different computing node, storing the output dataset in the data share.

19. The information processing system of claim 13, wherein generating the set of dependency information comprises:
  determining that a read dependency exists between at least a first configuration operation of the two or more of the plurality of configuration operations and at least a second configuration operation of the two or more of the plurality of configuration operations, the read dependency indicating that the first configuration operation requires an input generated by the second configuration operation.

20. The information processing system of claim 13, wherein generating the set of dependency information comprises:
  determining that a write dependency exists between at least a first configuration operation of the two or more of the plurality of configuration operations and at least a second configuration operation of the two or more of the plurality of configuration operations, the write dependency indicating that an output generated by the first configuration operation is required as an input by the second configuration operation.

* * * * *